(12) United States Patent
Kanematsu

(10) Patent No.: US 10,237,440 B2
(45) Date of Patent: Mar. 19, 2019

(54) PRINTING APPARATUS AND CONTROL METHOD FOR PRINTING APPARATUS

(71) Applicant: CANON KABUSHIKI KAISHA, Tokyo (JP)

(72) Inventor: Shinichi Kanematsu, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/238,576

(22) Filed: Aug. 16, 2016

(65) Prior Publication Data

US 2017/0064134 A1 Mar. 2, 2017

(30) Foreign Application Priority Data

Aug. 27, 2015 (JP) ................................. 2015-168289

(51) Int. Cl.
*H04N 1/32* (2006.01)
*H04N 1/23* (2006.01)
*H04N 1/29* (2006.01)
*H04N 1/00* (2006.01)

(52) U.S. Cl.
CPC ....... *H04N 1/32133* (2013.01); *H04N 1/0071* (2013.01); *H04N 1/00925* (2013.01); *H04N 1/2353* (2013.01); *H04N 1/29* (2013.01); *H04N 2201/0091* (2013.01); *H04N 2201/3205* (2013.01)

(58) Field of Classification Search
CPC ............. H04N 1/32133; H04N 1/0071; H04N 1/00925; H04N 1/2353; H04N 1/29; H04N 2201/0091; H04N 2201/3205
See application file for complete search history.

(56) References Cited

U.S. PATENT DOCUMENTS

| | | | | |
|---|---|---|---|---|
| 2004/0160641 A1* | 8/2004 | Kohler | ..................... | G06K 1/12 358/1.18 |
| 2007/0035771 A1 | 2/2007 | Kitamaru | | |
| 2007/0058214 A1 | 3/2007 | Honma | | |
| 2009/0059245 A1 | 3/2009 | Konuma | | |
| 2010/0027060 A1 | 2/2010 | Ogino | | |
| 2011/0103587 A1* | 5/2011 | Oda | ..................... | H04L 9/0894 380/277 |

FOREIGN PATENT DOCUMENTS

| | | |
|---|---|---|
| CN | 101382753 A | 3/2009 |
| CN | 101626443 A | 1/2010 |
| CN | 101715033 A | 5/2010 |

(Continued)

*Primary Examiner* — Iriana Cruz
(74) *Attorney, Agent, or Firm* — Canon U.S.A., Inc. IP Division

(57) ABSTRACT

A printing apparatus capable of adding information to a printing target image includes an addition unit configured to add the information, a setting unit configured to set an area to which the information is added based on a user operation, a specification unit configured to specify a length of a sheet used for printing in a sheet conveyance direction, and a control unit configured to control, in a case where the length of the sheet in the sheet conveyance direction is not specified, the addition unit to add the information into a leading end side area in the sheet conveyance direction even if a trailing end side area is set by the setting unit as the area to which the information is added.

33 Claims, 10 Drawing Sheets

(56) References Cited

FOREIGN PATENT DOCUMENTS

| | | |
|---|---|---|
| JP | H08-195867 A | 7/1996 |
| JP | 2005-238451 A | 9/2005 |
| JP | 2007-148745 A | 6/2007 |
| JP | 2012-185747 A | 9/2012 |
| JP | 2012-217086 A | 11/2012 |

\* cited by examiner

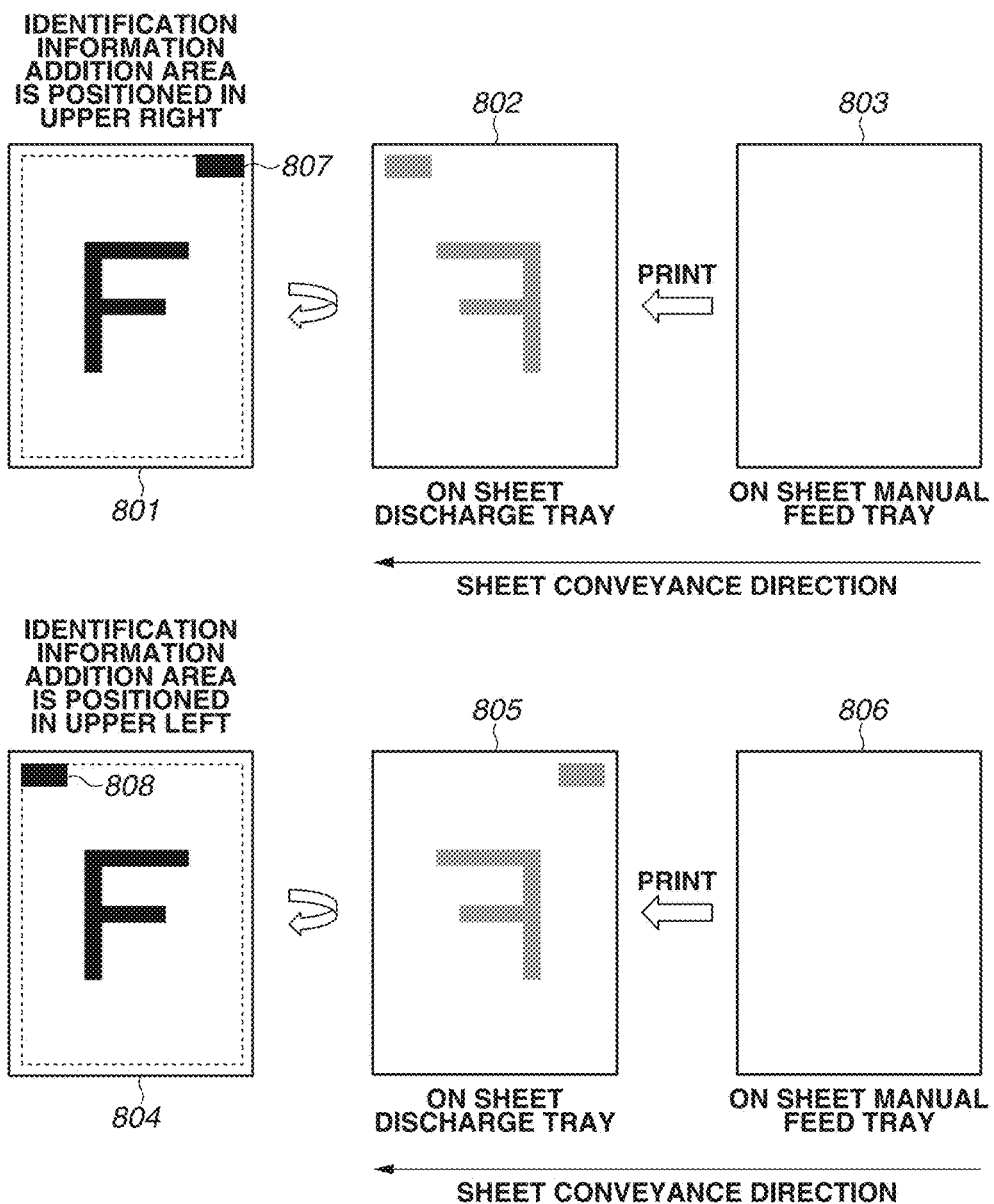

PRINTING APPARATUS AND CONTROL METHOD FOR PRINTING APPARATUS

BACKGROUND OF THE INVENTION

Field of the Invention

The present invention relates to a printing apparatus capable of adding information to an image of a printing target.

Description of the Related Art

Conventionally, a technique of adding information to a printing target image and printing it has been known. In Japanese Patent Application Laid-Open No. 2012-217086, adding information including letters such as "confidential" or "important" and figures such as a production date of a printed material to the printed material is discussed. Further, in Japanese Patent Application Laid-Open No. 2012-217086, selecting an area to add the information from options such as "upper left", "upper middle", "upper right", "lower left", "lower middle", "lower right" of a document is discussed.

Further, using a cassette and a sheet manual feed tray provided in a printing apparatus as a sheet supply source of sheets to be used for printing is known.

In a case where a cassette is used as a sheet supply source, a sheet size stacked on the cassette (e.g., A4 and B5) can be specified by a user to control printing of an image based on the received sheet size. Alternatively, it is possible to automatically detect lengths of a sheet in a main scanning direction and a sub-scanning direction based on guide positions provided in the cassette.

On the other hand, in a case where a sheet manual feed tray is used as a sheet supply source, the sheet size of a sheet placed on the sheet feed tray (e.g., A4 and B5) can be specified by a user. However, there are some printing apparatuses having a configuration in which a length of a sheet in the main scanning direction can be detected, but a length of the sheet in the sub-scanning direction (i.e., sheet conveyance direction) cannot be detected, based on the guide positions provided in the sheet manual feed tray. In the printing apparatus having such a configuration, a user has to designate the sheet size of the sheet that the user has placed on the sheet manual feed tray without fail, and it is a troublesome for the user. Therefore, to solve such a problem, it is known to prepare an option of "free-size".

When the "free-size" is set as the size of a sheet placed on the sheet manual feed tray, the printing apparatus starts printing an image on the sheet without knowing the length of the sheet in the sheet conveyance direction. In this case, if the length of the printing target image in the sub-scanning direction is shorter than the length of the sheet in the sheet conveyance direction, the image can be printed within the sheet. However, in a case where the length of the printing target image in the sub-scanning direction is longer than the length of the sheet in the sheet conveyance direction, for example, in an electrophotographic method printing apparatus, an image is developed on a photosensitive drum, but the image is not transferred onto a sheet because the length of the sheet is not enough.

Meanwhile, as for adding information to the printing target image described above, the upper right, lower right, upper left, and lower left of a sheet can be selected as an area to add information. In this case, the trailing end side area of the sheet in the sheet conveyance direction may be selected. If the length of the sheet in the sheet conveyance direction is preliminarily know, information can be added at a position suitable for the length of the sheet. However, if "free-size" is set, printing of an image is started in a state where the length of the sheet in the sheet conveyance direction is not known by the printing apparatus. As a result, the information is not added at a suitable position, and the position of the information to be added may possibly be located out of the printed sheet.

SUMMARY OF THE INVENTION

The present invention is directed to a printing apparatus capable of suitably adding information onto a printing target image, even in a case where a length of a sheet in a sheet conveyance direction is not preliminarily known.

According to an aspect of the present invention, a printing apparatus capable of adding information to a printing target image includes an addition unit configured to add the information, a setting unit configured to set an area to which the information is added based on a user operation, a specification unit configured to specify a length of a sheet used for printing in a sheet conveyance direction, and a control unit configured to control, in a case where the length of the sheet in the sheet conveyance direction is not specified, the addition unit to add the information into a leading end side area in the sheet conveyance direction even if a trailing end side area is set by the setting unit as the area to which the information is added.

Further features of the present invention will become apparent from the following description of exemplary embodiments with reference to the attached drawings. Each of the embodiments of the present invention described below can be implemented solely or as a combination of a plurality of the embodiments or features thereof where necessary or where the combination of elements or features from individual embodiments in a single embodiment is beneficial.

BRIEF DESCRIPTION OF THE DRAWINGS

FIG. 8 a schematic diagram illustrating addition of identification information according to an exemplary embodiment.

DESCRIPTION OF THE EMBODIMENTS

A printing apparatus according to an exemplary embodiment of the present invention will be described in detail below with reference to the accompanying drawings. Note that exemplary embodiments described below are not intended to limit the scope of the invention according to the claims, and combinations of features described in the exemplary embodiments are not necessarily indispensable as solutions of the present invention.

Figure 1:
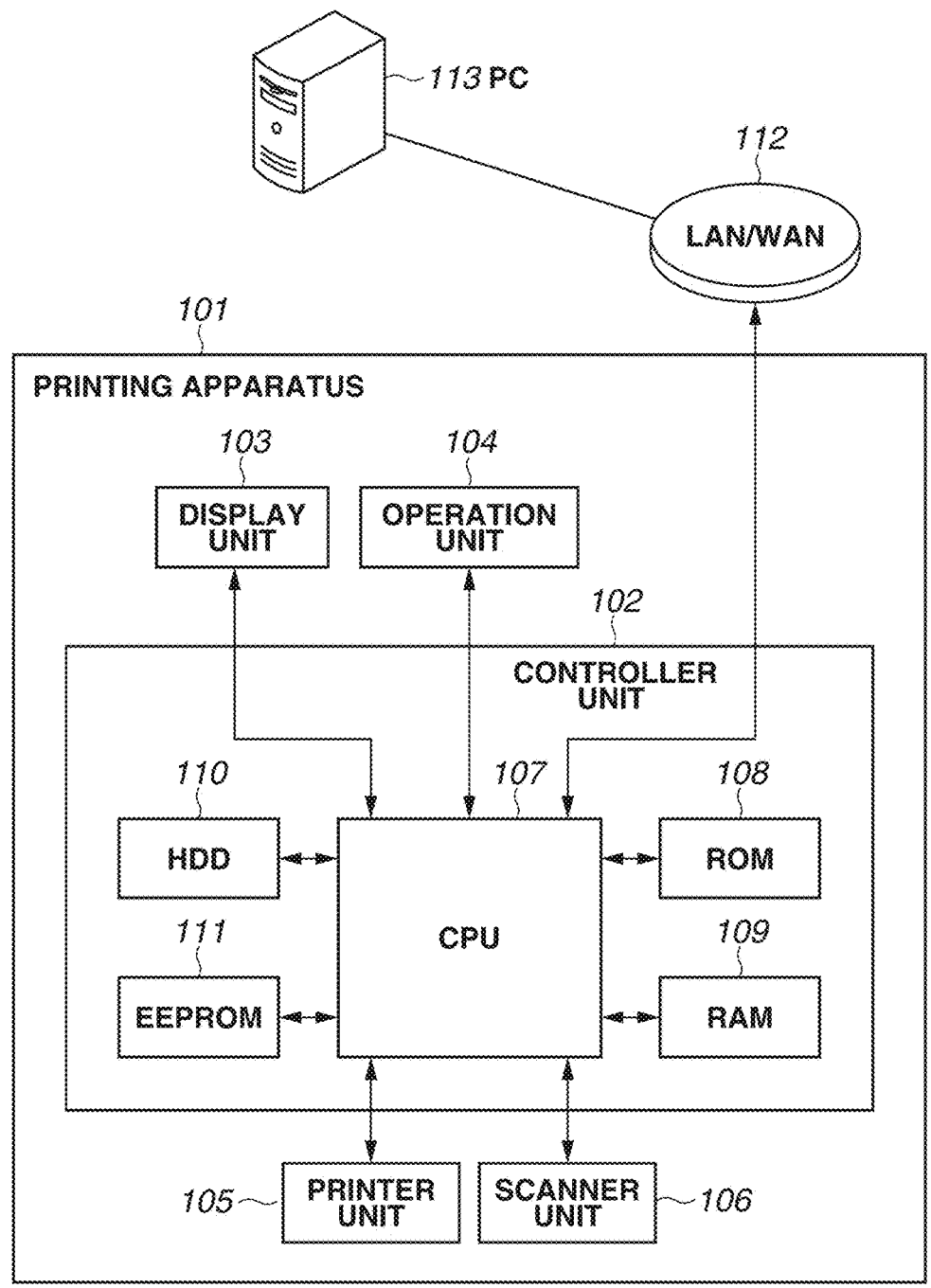
FIG. 1 is an overall view illustrating a system including a printing apparatus according to an exemplary embodiment of the present invention.

FIG. 1 is an overall view illustrating a system including a printing apparatus 101 as an example of a printing apparatus according to a first exemplary embodiment of the present invention. The printing apparatus 101 includes a controller unit 102, a display unit 103, an operation unit 104, a printer unit 105, and a scanner unit 106. The display unit 103 includes light-emitting diodes (LEDs) and a liquid crystal display to display operation contents by a user, an internal state of the apparatus, and the like. The operation unit 104 receives a user operation via a hardware key group or a touch panel function of the display unit 103.

The printer unit 105 receives a printing instruction form the controller unit 102 to print an image on a sheet based on image data transmitted from the controller unit 102. The scanner unit 106 receives a reading instruction from the controller unit 102 to read an image on a document. Then, the scanner unit 106 transmits the obtained image data to the controller unit 102. In addition, the printer unit 105 can perform printing based on image data generated by the scanner unit 106 (i.e., copy job).

The controller unit 102 includes a central processing unit (CPU) 107, a read only member (ROM) 108, a random access memory (RAM) 109, a hard disk drive (HDD) 110, and an electrically erasable programmable read-only memory (EEPROM) 111. The CPU 107 executes a control program stored in the printing apparatus 101 to control operations of devices connected to the controller unit 102 via interfaces and by using memories of storage media. The ROM 108 stores, for example, a boot program required for system startup. The RAM 109 is a volatile memory used as a work memory to execute the control program.

The HDD 110 is a storage medium such as a magnetic disk storing a control program, image data, and the like. The EEPROM 111 is a nonvolatile memory to store setting values and the like required when the control program is executed.

The CPU 107 can receive page-description language (PDL) data from a personal computer (PC) 113 (i.e., external apparatus) via a local area network (LAN)/wide area network (WAN) 112, and control the printer unit 105 to perform printing based on the received PDL data (i.e., PDL job). The PDL data is generated by a printer driver installed in the PC 113 serving as a host computer.

Figure 2A:
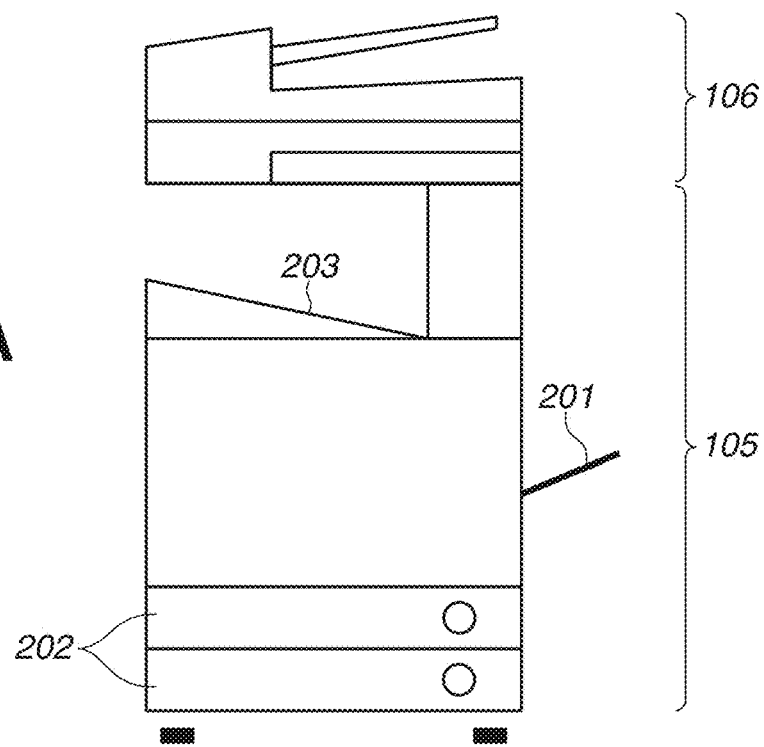
FIGS. 2A and 2B are respectively an external view and a conveyance path diagram of the printing apparatus according to an exemplary embodiment.

FIG. 2A is an external view of the printing apparatus 101. The lower part and the upper part of the body of the printing apparatus 101 respectively correspond to the printer unit 105 and the scanner unit 106. The printing apparatus 101 is provided with a sheet manual feed tray 201 and cassettes 202 as a sheet supply source of sheets used for printing. In addition, the printing apparatus 101 is provided with a sheet discharge tray 203 as a discharge destination of sheets on which images are printed.

Figure 2B:
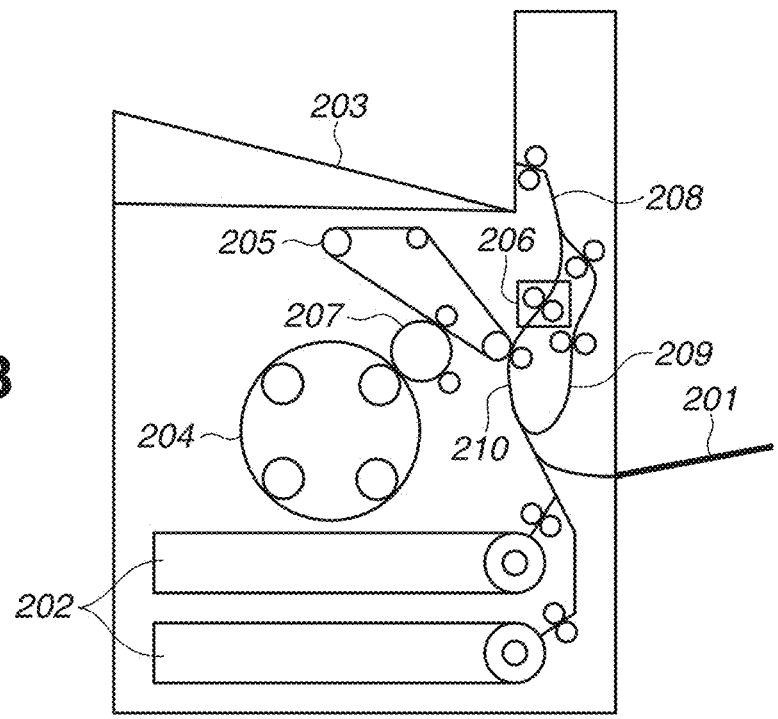

FIG. 2B is a diagram illustrating a sheet conveyance path in the printer unit 105. A photosensitive drum 207 is exposed to light by an exposure unit (not illustrated) after being subjected to charging processing to a specific polarity potential. With this processing, an electrostatic latent image is formed on the photosensitive drum 207. Then, the electrostatic latent image is developed by attaching toner onto the photosensitive drum 207 using a developing unit 204.

The image developed on the photosensitive drum 207 is transferred onto an intermediate transfer belt 205, and then, the developed image is transferred onto a sheet conveyed from the sheet manual feed tray 201 or the cassette 202 to the conveyance path 210. The sheet on which the image is transferred is conveyed to a fixing unit 206. At the fixing unit 206, fixing processing is performed by an application of heat and pressure. In a case of single-sided printing, the fixing-completed sheet is discharged onto the sheet discharge tray 203 via a conveyance path 208 with the printed surface facing down. In a case of two-sided printing, the fixing-completed sheet is reversed in the conveyance path 208, and fed to the conveyance path 210 again via a conveyance path 209. In a case of two-sided printing, printing on the back side of the sheet is performed first, and then the sheet is discharged with the front side thereof facing down.

Figure 3:
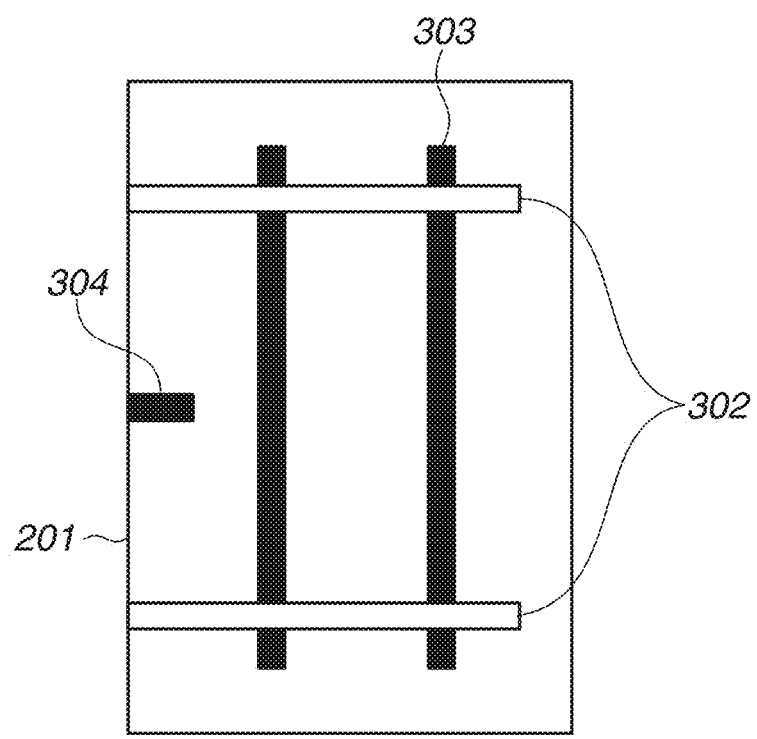
FIG. 3 is an external view of a sheet manual feed tray of the printing apparatus according to an exemplary embodiment.

FIG. 3 is an external view of the sheet manual feed tray 201 seen from above. On the sheet manual feed tray 201, a pair of guides 302 movable on rails freely is provided, and the distance between the guides 302 can be detected by a guide distance sensor 303. A sheet detection sensor 304 can detect the presence of a sheet on the sheet manual feed tray 201.

When the detection result of the sheet detection sensor 304 changes form "sheet absent" to "sheet present", the printer unit 105 detects the sheet width on the sheet manual feed tray 201 (length in the main scanning direction) based on the detection result of the guide distance sensor 303. Then, the printer unit 105 notifies the controller unit 102 of the detected sheet width together with the information indicating "sheet present". Further, when the detection result of the sheet detection sensor 304 changes from "sheet present" to "sheet absent", the printer unit 105 notifies the controller unit 102 of the information indicating "sheet absent".

Figure 4:
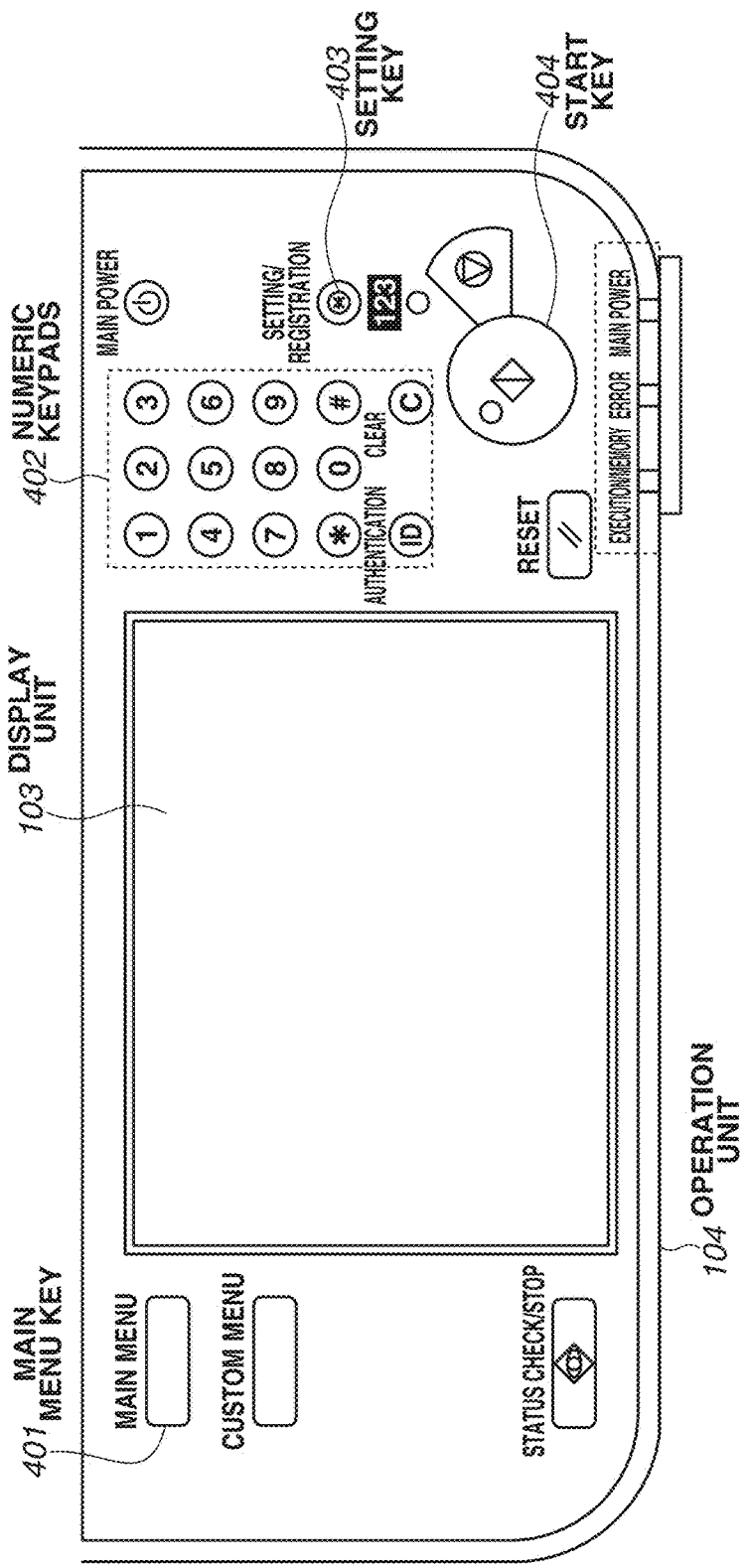
FIG. 4 is an external view of an operation unit of the printing apparatus according to an exemplary embodiment.

FIG. 4 is an external view of the operation unit 104 including the display unit 103. A main menu key 401 is a key used for displaying a main menu illustrated in FIG. 6A on the display unit 103. Numeric keypads 402 are used by a user to input numeric values. A setting key 403 is a key pressed when various settings of the whole printing apparatus 101 are made. A start key 404 is a key pressed when an instruction to execute processing such as printing is issued.

Figure 5:
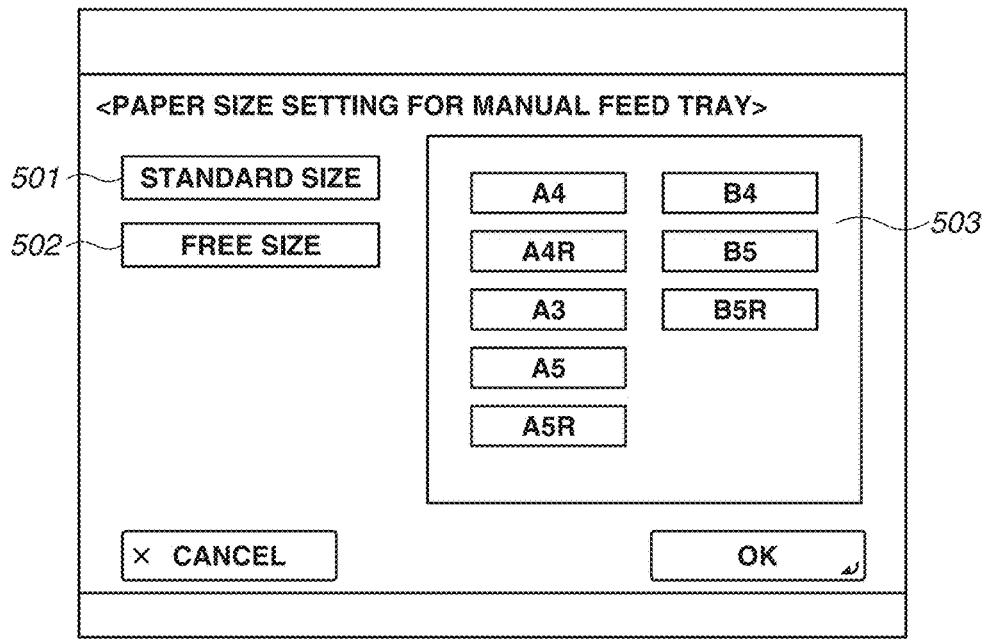
FIG. 5 is an example of a screen displayed on a display unit of the printing apparatus according to an exemplary embodiment.

FIG. 5 is an operation screen displayed on the display unit 103 when the detection result of the sheet detection sensor 304 changes from "sheet absent" to "sheet present". The user makes a setting about the sheet size of a sheet placed on the sheet manual feed tray 201 via the operation screen illustrated in FIG. 5. A standard size key 501 is pressed when a specific sheet size of the sheet placed on the sheet manual feed tray 201 is set. When the standard size key 501 is pressed, a size selection field 503 changes to an operable state and the user can select a specific size such as A4 and B5. In addition to the standard sizes, non-standard size for which a user can arbitrarily input height and width lengths of a sheet may be added as an option. In a case where the standard size or the non-standard size is set, it corresponds to a case where "the length of the sheet in the sheet conveyance direction is specified" described below. In addition, the "standard size" refers to a size of sheet widely used, and the "non-standard size" refers a size of sheet not widely used compared to the "standard size" of sheet.

A free size key 502 is pressed when a user wants to avoid a trouble to set a sheet size of a sheet placed on the sheet manual feed tray 201. When the free size key 502 is pressed, the size selection field 503 becomes inoperable. When the "free-size" is set, printing of an image is started in a state where the printing apparatus 101 does not know the length of the sheet in the sheet conveyance direction. In other words, when the "free-size" is set, it corresponds to a case where "the length of the sheet in the sheet conveyance direction is not specified" described below. The settings made via the screen in FIG. 5 are stored in the EEPROM 111.

Figure 6A:
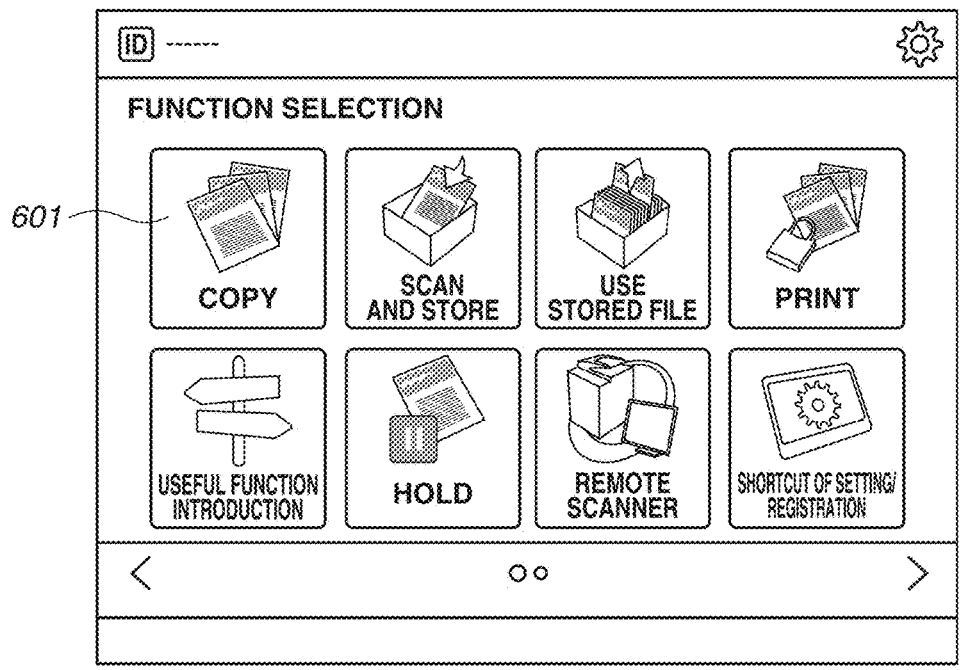
FIGS. 6A and 6B are examples of screens displayed on the display unit of the printing apparatus according to an exemplary embodiment.
Figure 6B:
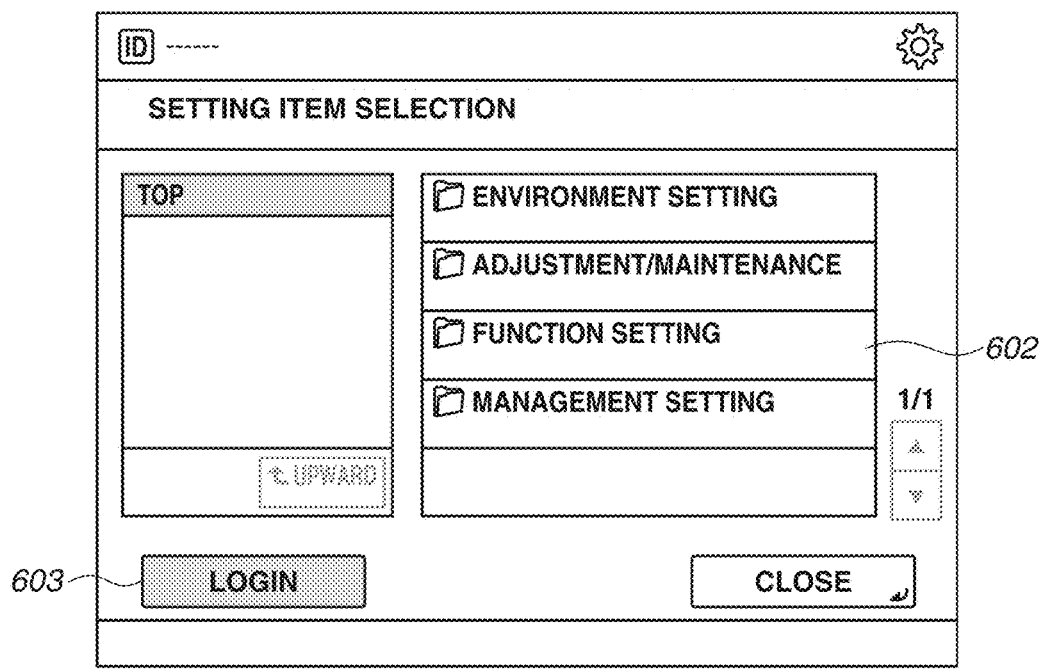

FIG. 6A illustrates an operation screen displayed on the display unit 103 when the main menu key 401 is pressed. As illustrated in FIG. 6A, the printing apparatus 101 is provided with a plurality of functions such as "copy" and "print". FIG. 6B illustrates an operation screen displayed on the display unit 103 when the setting key 403 is pressed. A user can make various kinds of settings via screens that can further be shifted from this screen.

Figure 7A:
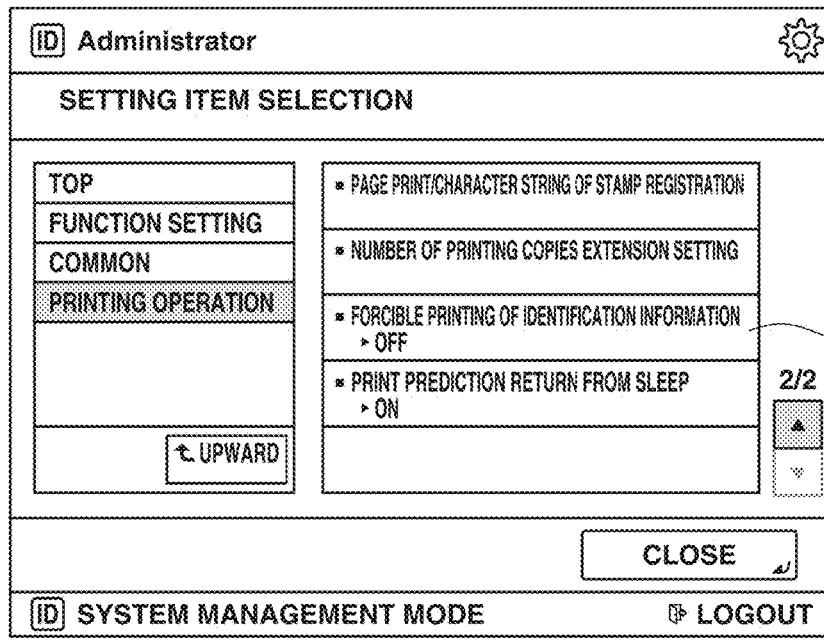
FIGS. 7A and 7B are examples of screens displayed on the display unit of the printing apparatus according to an exemplary embodiment.

FIG. 7A illustrates an operation screen displayed on the display unit 103 when an item 602 named "function setting" is selected via the operation screen illustrated in FIG. 6B. This screen includes an item 701 of "forcible printing of identification information". The item 701 is displayed in a grayout manner when a general user is operating the printing apparatus 101, because the item 701 is an item settable only by an administrator of the printing apparatus 101. If a user wants to make a setting of the item 701, the user needs to press a login key 603 in FIG. 6B to be authorized as an administrator.

Figure 7B:
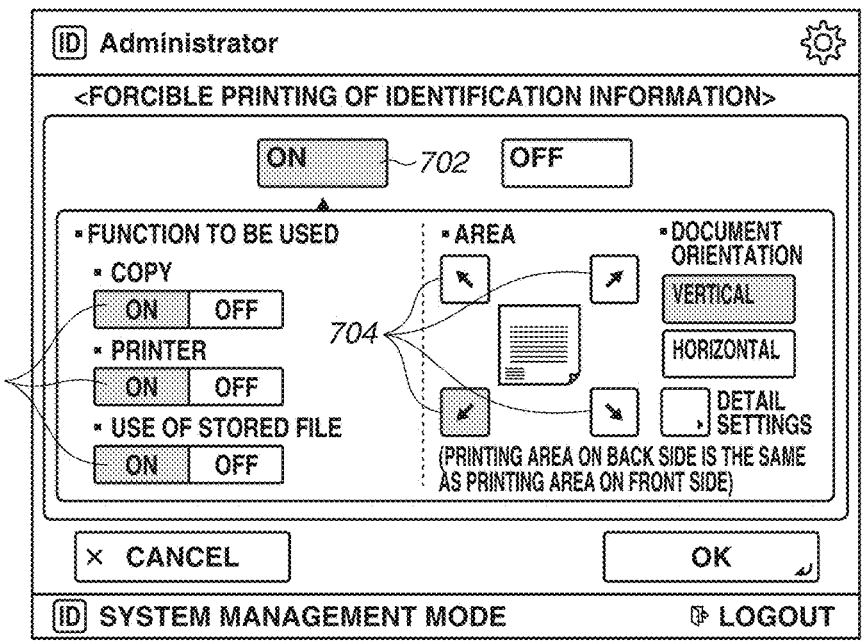

FIG. 7B illustrates an operation screen displayed on the display unit 103 when the item 701 in FIG. 7A is selected. Through this screen, a user can make settings concerning printing of identification information. The identification information in the present exemplary embodiment includes user information of users (e.g., user who instructs printing and user of the printing apparatus 101). Other than the user information, the identification information includes the printing date and time, the IP address of the printing apparatus 101, and the serial number of the printing apparatus 101. By forcibly adding (printing) the user information indicating a user to the printed sheet, the user who prints the sheet can be specified later based on the printed sheet. The user (user of the printing apparatus 101) indicated by the user information is a user who has logged in the printing apparatus 101 when a copy job is performed. On the other hand, when a PDL job is executed, it is a user who has logged in the PC 113 serving as a host computer.

To print identification information, the user presses an ON key 702. A key group 703 includes keys each used to set whether to print identification information for a function. A key group 704 includes keys used to select an area to add the identification information. Areas to which the identification information can be added are four areas of upper right, lower right, upper left, and lower left of an image. The settings performed via the screen illustrated in FIG. 7B are stored in the EEPROM 111 as setting values.

FIG. 8 is a schematic diagram illustrating a relationship between the sheet conveyance direction and the identification information addition area selected using the key group 704. Sheets 801 to 803 illustrate a case where "upper right" is set as an identification information addition area. In this case, first, a sheet not printed on both sides thereof (hereinbelow, referred to as a both sides blank sheet) is placed on the sheet manual feed tray 201 (sheet 803 in FIG. 8). The sheet is conveyed in a direction from the right side to the left side in FIG. 8, and an image is printed on the back side of the sheet in FIG. 8. As described referring to FIG. 2B, this is because in a case where the sheet manual feed tray 201 is used as a sheet supply source, the back side (down side) of a sheet placed on the sheet manual feed tray 201 is a print surface. The sheet on which an image has been printed is discharged onto the sheet discharge tray 203 with the printed surface facing down. A sheet 802 illustrates a state where the sheet discharge tray 203 is viewed from the upper side.

When the user picks up to reverse the sheet discharged onto the sheet discharge tray 203, the state of the sheet 802 changes to a state of a sheet 801. At that time, as illustrated as an area 807, the identification information is added onto the upper right side of the sheet 801. The solid lines in FIG. 8 indicate sheet edges, and the dotted lines indicate a printable area of an image. In a case where the identification information is printed in the upper right position, the upper right point of a rectangle corresponding to the added information is arranged so as to match the upper right point of the printable area. Alternatively, it may be arranged at a position inside the printable area with a little margin from the end of the printable area, and the amount of margin may be set by a user.

Referring to the sheet 802 in FIG. 8, in order to add the identification information onto the upper right side of the sheet in the state of sheet 801, it can be seen that the identification information is added on the leading end side in the sheet conveyance direction. Further, also in order to add the identification information on the lower right side of the sheet in the state of sheet 801, the identification information is added on the leading end side in the sheet conveyance direction (not illustrated).

On the other hand, the sheets 804 to 806 in FIG. 8 illustrate a case where "upper left" is set as the identification information addition area. In this case, first, a both sides blank sheet 806 is placed on the sheet manual feed tray 201. The sheet is conveyed in the direction from the right side to the left side in FIG. 8, and an image is printed on the back side the sheet in FIG. 8. The sheet on which an image has been printed is discharged onto the sheet discharge tray 203 with the printed surface facing down. A sheet 805 illustrates a state where the sheet discharge tray 203 is viewed from the upper side.

When the user picks up to reverse the sheet discharged onto the sheet discharge tray 203, the state of the sheet 805 changes to a state of a sheet 804. At that time, as illustrated as an area 808, the identification information is added onto the upper left side of the sheet 804. Referring to the sheet 805 in FIG. 8, in order to add the identification information onto the upper left side of the sheet in the state of sheet 804, the identification information is added on the trailing end side in the sheet conveyance direction. Further, also in order to add the identification information on the lower left side of the sheet in the state of the sheet 804, the identification information is added on the trailing end side in the sheet conveyance direction (not illustrated).

In a case where the sheet manual feed tray 201 is used as the sheet supply source and a specific size is set using the standard size key 501, the identification information can be added onto a set area even though the identification information addition area is set to any one of "upper right", "lower right", "upper left", and "lower left". It is because, since the lengths of the sheet in the main scanning direction and the sheet conveyance direction (sub-scanning direction) can be specified if a specific size is set, the identification information can be added to a position according to the lengths.

On the other hand, in a case where a specific size is not set (i.e., when the free size key 502 is pressed), a trouble occurs if the identification information addition area is set to "upper left" or "lower left". It is because, when "free-size"

is set, the length of a sheet in the sheet conveyance direction (i.e., sub-scanning direction) cannot be specified, and therefore, at a time point before printing is started, a position at which the identification information is to be added cannot be determined accurately. On the other hand, the length in the direction orthogonal to the sheet conveyance direction (i.e., main scanning direction) can be specified by the guide distance sensor 303. Therefore, if the identification information addition area is set to "upper right" or "lower right", the identification information can be added appropriately even if "free-size" is set.

Taking these points described above into consideration, in the present exemplary embodiment, in a case where "free-size" is set, the printing position of the identification information is controlled to be added to the upper right area of the sheet (i.e., leading end side area of the sheet in the sheet conveyance direction) even if "upper left" or "lower left" is set as the identification information addition area.

Figure 9:
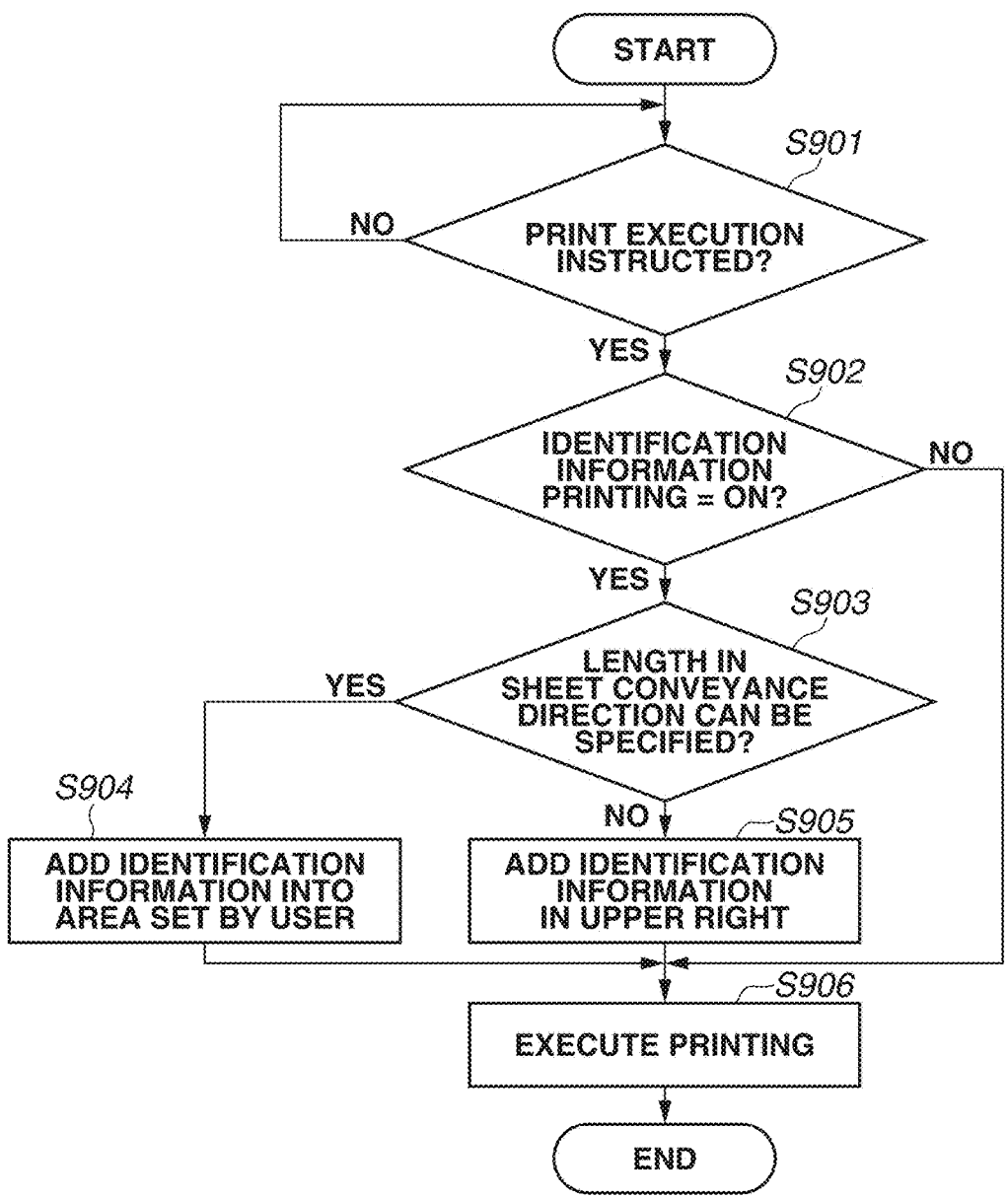
FIG. 9 is a flowchart illustrating an operation of the printing apparatus according to an exemplary embodiment.

FIG. 9 is a flowchart illustrating an operation performed when an execution of printing is instructed. Each operation (step) illustrated in the flowchart in FIG. 9 is realized by the CPU 107 of the printing apparatus 101 executing a control program stored in the ROM 108.

In step S901, the CPU 107 determines whether an execution of printing is instructed. In the present exemplary embodiment, when the start key 404 is pressed, the CPU 107 determines that the execution of printing is instructed (YES in step S901), and the processing proceeds to step S902. In step S902, the CPU 107 determines whether printing of identification information is set to ON. The determination is performed by referring to information set via the screen illustrated in FIG. 7B and stored in the EEPROM 111. When the printing of the identification information is set to ON (YES in step S902), the processing proceeds to step S903. On the other hand, when it is not set to ON, i.e., set to OFF (NO in step S902), the processing proceeds to step S906.

In step S903, the CPU 107 determines whether the length of the sheet in the sheet conveyance direction can be specified based on the information stored in the EEPROM 111. In a case where the sheet supply source is the sheet manual feed tray 201 and a specific size is set using the standard size key 501, the CPU 107 determines that the length of the sheet in the sheet conveyance direction can be specified (YES in step S903), and the processing proceeds to step S904. On the other hand, if "free-size" is set, the CPU 107 determines that the length of the sheet in the sheet conveyance direction cannot be specified (NO in step S903), and the processing proceeds to step S905. In a case where the sheet supply source is the cassette 202, the CPU 107 determines that the length of the sheet in the sheet conveyance direction can be specified (YES in step S903), and the processing proceeds to step S904.

In step S904, the identification information is added to the set area using the key group 704 in FIG. 7B. More specifically, if the area is set to "upper right", "lower right", "upper left", or "lower left", the identification information is respectively added to the upper right, lower right, upper left, or lower left of the sheet. On the other hand, in step S905, the identification information is added to the upper right of the sheet regardless of the area set using the key group 704 in FIG. 7B. In the present exemplary embodiment, even if the identification information addition area is set to "lower right", the identification information is added to "upper right" of the sheet. However, since the "lower right" is the leading end side area of the sheet in the sheet conveyance direction, the identification information may be added to the lower right of the sheet without changing the position, if "lower right" is set as the identification information addition area. Further, in a case where "lower left" is set as the identification information addition area, the identification information is also added to the upper right of the sheet. However, when "lower left" is set as the identification information addition area, the identification information may be added to the lower right of the sheet.

In step S906, the CPU 107 prints an image to which the identification information is added or not added. If the printing target includes a plurality of pages, after step S906, the processing returns to step S902 to repeat the processing.

As described above, in the present exemplary embodiment, in a case where the length of the sheet in the sheet conveyance direction is not specified, the identification information is controlled to be added to the leading end side area in the sheet conveyance direction, even if the trailing end side area in the sheet conveyance direction is set as the identification information addition area. Thus, even in a case where the length of the sheet in the sheet conveyance direction is not specified, the identification information can be appropriately added to the printing target image.

Next, a second exemplary embodiment will be described. In the first exemplary embodiment, even in a case where the length of the sheet in the sheet conveyance direction is not specified, the identification information addition area can be selected on the screen illustrated in FIG. 7B. Therefore, in a case where "free-size" is set and other than "upper right" is set as the identification information addition area, the identification information is added to an area different from an area intended by the user. Thus, in the second exemplary embodiment, a configuration is described in which the identification information addition area is prohibited to be selected, in a case where the length of a sheet in the sheet conveyance direction is not specified (i.e., the sheet supply source is the sheet manual feed tray 201 and "free-size" is set).

Figure 10:
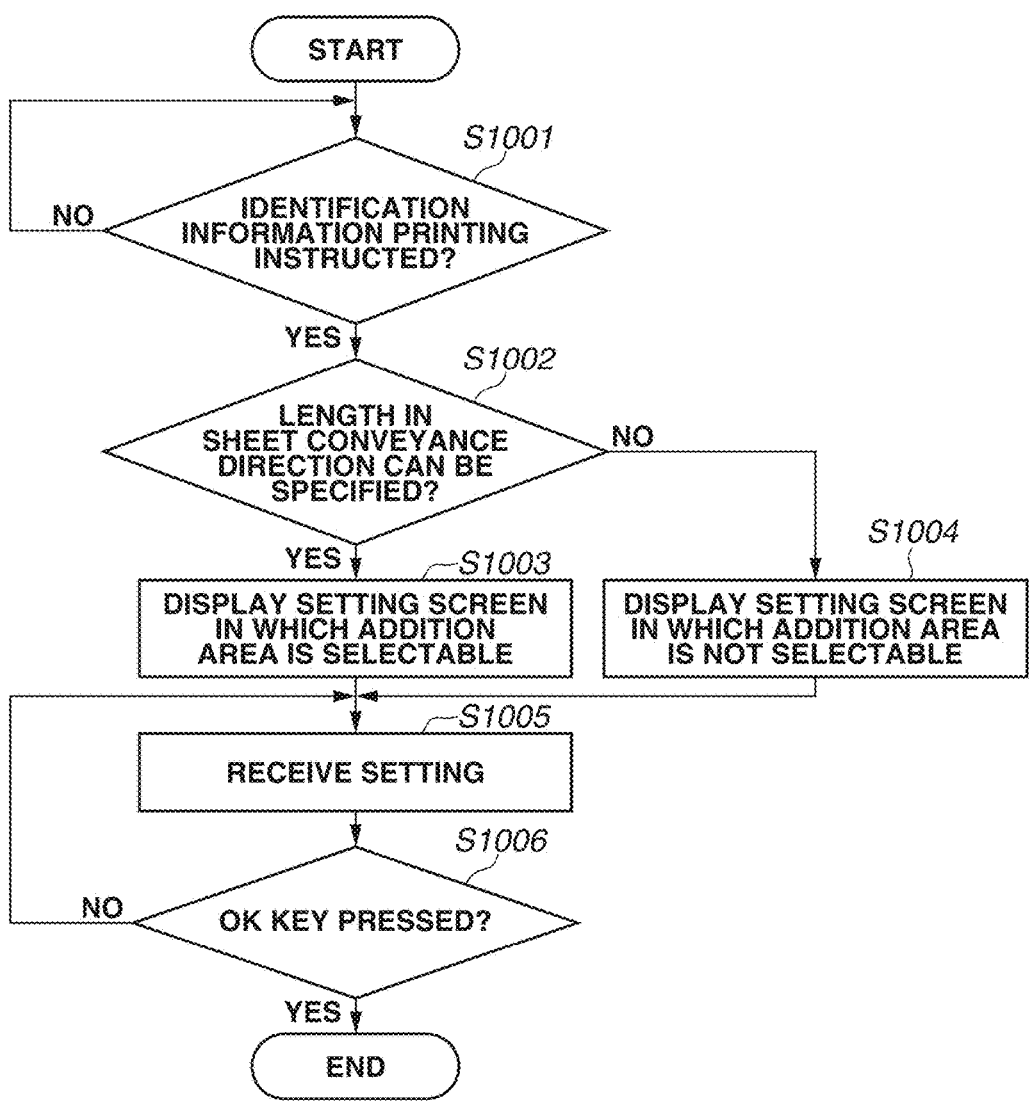
FIG. 10 is a flowchart illustrating an operation of the printing apparatus according to an exemplary embodiment.

FIG. 10 is a flowchart illustrating a setting operation of printing the identification information. Each operation (step) illustrated in the flowchart in FIG. 10 is realized by the CPU 107 of the printing apparatus 101 executing a control program stored in the ROM 108.

In step S1001, the CPU 107 determines whether the setting of printing the identification information is instructed. In a case where the item 701 illustrated in FIG. 7A is selected, the CPU 107 determines that the setting of printing the identification information is instructed (YES in step S1001), and the processing proceeds to step S1002.

In step S1002, the CPU 107 determines whether the length of the sheet in the sheet conveyance direction can be specified based on the information stored in the EEPROM 111. In a case where a sheet supply source is the sheet manual feed tray 201 and a specific size is set using the standard size key 501, the CPU 107 determines that the length of the sheet in the sheet conveyance direction can be specified (YES in step S1002), and the processing proceeds to step S1003. On the other hand, in a case where "free-size" is set, the CPU 107 determines that the length of the sheet in the sheet conveyance direction cannot be specified (NO in step S1002), and the processing proceeds to step S1004. In addition, in a case where the sheet supply source is the cassette 202, the CPU 107 determines that the length of the sheet in the sheet conveyance direction can be specified (YES in step S1002), and the processing proceeds to step S1003.

In step S1003, the CPU 107 displays the setting screen illustrated in FIG. 7B via which the identification information addition area can be selected. On the other hand, in step S1004, the CPU 107 displays the setting screen illustrated in FIG. 7B via which the identification information addition area cannot be selected. The screen displayed at that time is a screen in which other than "upper right" is displayed in a gray out manner among the key group 704 illustrated in FIG. 7B.

In step S1005, the CPU 107 receives settings made via the screen displayed in step S1003 or in step S1004. Next, in step S1006, the CPU 107 determines whether an OK key is pressed. If the CPU 107 determines that an OK key is pressed (YES in step S1006), the processing ends.

As described above, according to the present exemplary embodiment, in a case where the length of the sheet in the sheet conveyance direction is not specified, the CPU 107 prohibits the trailing end side area in the sheet conveyance direction from being set as the identification information addition area. With this operation, addition of the identification information to an area that is not intended by a user can be prohibited, and information can be appropriately added to the printing target image even if the length of the sheet in the conveyance direction is not specified.

Next, a third exemplary embodiment will be described. In the first exemplary embodiment, even in a case where the length of the sheet in the sheet conveyance direction is not specified, the identification information addition area can be selected via the screen illustrated in FIG. 7B. Therefore, in a case where "free-size" is set and other than "upper right" is set as the identification information addition area, the identification information is added to an area different from an area intended by the user. Therefore, a printing apparatus 101 according to the third exemplary embodiment, in a case where the length of the sheet in the conveyance direction is not specified (i.e., the sheet supply source is the sheet manual feed tray 201 and "free-size" is set), depending on the set position of the identification information addition area, the printing target image is rotated by 180 degrees, and the rotated image and the identification information is printed on a sheet.

More specifically, if the position of the identification information addition area is set to "lower left", the printing apparatus 101 rotates the printing target image by 180 degrees, and prints the rotated image on a sheet whose length in the conveyance direction is not specified. In this case, the printing apparatus 101 also rotates the image of the identification information by 180 degrees and then adds (prints) the rotated identification information image to "upper right" area of a sheet as performed in step S905 (area corresponding to the leading end side in the sheet conveyance direction).

Further, if the position of the set identification information addition area is "upper left", the printing apparatus 101 rotates the printing target image by 180 degrees, and prints the rotated image on a sheet whose length in the sheet conveyance direction is not specified. In this case, the printing apparatus 101 rotates the identification information image by 180 degrees and then adds (prints) the rotated identification information image to the "lower right" area of a sheet (area corresponding to the leading end side in the sheet conveyance direction).

On the other hand, if the position of the set identification information addition area is "upper right" or "lower right", the printing apparatus 101 prints the printing target image and the identification information image on the sheet without rotating them by 180 degrees, different from the case described above. In this case, if the position of the identification information addition area is "upper right", the identification information image is added (printed) to the "upper right" area of the sheet. If the position of the identification information addition area is "lower right", the identification information image is added (printed) to the "lower right" area of the sheet.

In this way, the position of the identification information relative to the printed image can be adapted to the position of the set identification information addition area.

The identification information including user information is described as an example of information to be added to the printing target image in the above-described exemplary embodiments. However, it is not limited thereto, and the present invention may be applied to a case where other information (e.g., a page number, a number of copies, and a mark indicating a level of importance) is added.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-168289, filed Aug. 27, 2015, which is hereby incorporated by reference herein in its entirety.

What is claimed is:

1. A printing apparatus for adding information to an image to be printed on a sheet, the printing apparatus comprising:
a memory device storing instructions; and
one or more processors that executes the instructions to cause the printing apparatus to act as:
an addition unit configured to add the information;
a first setting unit configured to set, based on a user operation, an area on which the information is printed in a sheet;
a second setting unit configured to set, based on a user operation, a sheet size option in which it is not necessary for a user to specify a length in a sheet conveyance direction of the sheet on which the image is to be printed; and a control unit configured to control the addition unit to add the information to the image, so that the information is printed on an area in the sheet corresponding to the area set by the first setting unit, wherein the control unit is further configured to control, according to the setting of the sheet size option by the second setting unit in which it is not necessary for the user to specify a length in the sheet conveyance direction of the sheet on which the image is to be printed, the addition unit to add the information to the image, so that the information is printed on a leading end side area in the sheet conveyance direction of the sheet.

2. The printing apparatus according to claim 1, wherein the one or more processors causes the printing apparatus to act as a specification unit configured to specify a length of a sheet used for printing in a sheet conveyance direction, and wherein the control unit is configured, in a case where the length of the sheet in the sheet conveyance direction is specified by the specification unit and the trailing end side area in the sheet conveyance direction is set by the first setting unit, to control the addition unit to add the information into the area set by the first setting unit.

3. A printing apparatus for adding information to an image to be printed on a sheet, the printing apparatus comprising:

a memory device storing instructions; and one or more processors that executes the instructions to cause the printing apparatus to act as:

an addition unit configured to add the information;

a first setting unit configured to set, based on a user operation, an area to which the information is added;

a second setting unit configured to set, based on a user operation, a sheet size option in which it is not neccessary for a user to specify a length in a sheet conveyance direction of the sheet on which the image is to be printed; and a control unit configured to control the addition unit to add the information to the image, so that the information is printed on an area in the sheet corresponding to the area set by the first setting unit, wherein, according to the setting of the sheet size option by the second setting unit in which it is not neccessary for a user to specify a length in the sheet conveyance direction of the sheet on which the image is to be printed, an area corresponding to a trailing end side area in the sheet conveyance direction of the sheet on which the image is to be printed is prohibited from being set by the first setting unit.

4. The printing apparatus according to claim 3, wherein the one or more processors causes the printing apparatus to act as a specification unit configured to specify a length of a sheet used for printing in a sheet conveyance direction, and wherein, in a case where the length of the sheet in the sheet conveyance direction is specified by the specification unit, the trailing end side area in the sheet conveyance direction is not prohibited from being set by the first setting unit.

5. The printing apparatus according to claim 1, wherein the information includes user information indicating a user of the printing apparatus.

6. The printing apparatus according to claim 1, wherein the area set by the first setting unit is selected from options including at least upper left and lower left of the sheet.

7. The printing apparatus according to claim 1, further comprising a sheet manual feed tray, wherein the sheet is a sheet fed from the sheet manual feed tray provided in the printing apparatus.

8. A method for printing an image and additional information on a sheet, the method comprising:

setting, based on a user operation, an area on which the additional information is to be printed in a sheet;

setting, based on a user operation, a sheet size option in which it is not neccessary for a user to specify a length in a sheet conveyance direction of the sheet on which the image is to be printed; and according to the setting of the sheet size option in which it is not neccessary for the user to specify a length in the sheet conveyance direction of the sheet on which the image is to be printed, printing the additional information on a leading end side area in the sheet conveyance direction of the sheet.

9. A method for printing an image and additional information on a sheet, the method comprising:

setting, based on a user operation, a sheet size option in which it is not neccessary for a user to specify a length in a sheet conveyance direction of the sheet on which the image is to be printed; and setting, based on a user operation, an area on which the additional information is to be printed, wherein, in the setting of the area, according to the setting of the sheet size option in which it is not neccessary for the user to specify a length in the sheet conveyance direction of the sheet on which the image is to be printed, an area corresponding to a trailing end side area in the sheet conveyance direction of the sheet on which the image is to be printed is prohibited from being set.

10. The printing apparatus according to claim 1, wherein the control unit controls, according to the setting of the sheet size option by the second setting unit, the addition unit to add the information to the image, so that the information is printed on the leading end side area in the sheet conveyance direction of the sheet regardless of the area set by the first setting unit.

11. The method according to claim 8, wherein the printing prints, according to the setting of the sheet size option in which it is not necessary for the user to specify a length in the sheet conveyance direction of the sheet on which the image is to be printed, the additional information on a leading end side area in the sheet conveyance direction of the sheet, regardless of the setting of the area.

12. A printing apparatus for printing an image and additional information on a sheet, comprising:

a print position setting unit configured to set a position specified by a user as a position on the sheet where the additional information is to be printed;

a conveying unit configured to convey the sheet on which the image and the additional information are to be printed; and a printing unit configured to print the image and the additional information on the conveyed sheet;

wherein, on a sheet whose size is known to the printing apparatus, the printing unit prints the additional information at the position specified by the user and set by the print position setting unit as the position where the additional information is to be printed, and wherein, on a sheet whose size is unknown to the printing apparatus at a point in time of receiving a printing instruction from the user, the printing unit prints the additional information at a leading end positon only in a sheet conveying direction, in which the sheet is conveyed by the conveying unit.

13. The printing apparatus according to claim 12, wherein the position specified by the user is possible to be a tailing end position on the sheet in the sheet conveying direction.

14. The printing apparatus according to claim 13, wherein the position specified by the user is possible to be a leading end position on the sheet in the sheet conveying direction.

15. The printing apparatus according to claim 12,
wherein, on the sheet whose size is unknown to the printing apparatus, the printing unit prints the additional information at the leading end positon only in the sheet conveying direction, in which the sheet is conveyed by the conveying unit, regardless of the setting by the print position setting unit.

16. The printing apparatus according to claim 13,
wherein, on the sheet whose size is unknown to the printing apparatus, the printing unit prints the additional information at the leading end positon only in the sheet conveying direction, in which the sheet is conveyed by the conveying unit, even though a trailing end position on the sheet in the sheet conveying direction has been set by the print position setting unit as the position on the sheet where the additional information is to be printed.

17. The printing apparatus according to claim 12, further comprising:
a sheet size setting unit configured to, on a basis of a user instruction, make setting that the size of the sheet on which the image is to be printed is unknown to the printing apparatus;
wherein, in a case where the above setting is made by the sheet size setting unit, the sheet on which the image is to be printed is treated as the sheet whose size is unknown to the printing apparatus.

18. The printing apparatus according to claim 12,
wherein the sheet size unknown to the printing apparatus means that size information that varies from sheet size to sheet size has not been specified by the user to the printing apparatus.

19. The printing apparatus according to claim 12,
wherein the sheet size is defined by a sheet length in the sheet conveying direction and a sheet length in a direction perpendicular to the sheet conveying direction.

20. The printing apparatus according to claim 12,
wherein the sheet whose size is unknown to the printing apparatus is a sheet whose, at least, length in the sheet conveying direction is unknown to the printing apparatus.

21. The printing apparatus according to claim 20,
wherein the sheet whose size is known to the printing apparatus is a sheet whose length in the sheet conveying direction and length in a direction perpendicular to the sheet conveying direction are known to the printing apparatus.

22. The printing apparatus according to claim 12,
wherein the sheet whose size is unknown to the printing apparatus is a sheet whose length in the sheet conveying direction has not been specified by the user to the printing apparatus.

23. The printing apparatus according to claim 22,
wherein the sheet whose size is known to the printing apparatus is a sheet whose, at least, length in the sheet conveying direction has been specified by the user to the printing apparatus.

24. The printing apparatus according to claim 12,
wherein the sheet whose size is unknown to the printing apparatus is a sheet whose size has not been known by the printing apparatus before conveying the sheet on which the image and the additional information are printed.

25. The printing apparatus according to claim 24,
wherein the sheet whose size is unknown to the printing apparatus is a sheet whose length in the sheet conveying direction has not been known by the printing apparatus before conveying the sheet on which the image and the additional information are printed.

26. The printing apparatus according to claim 12,
wherein the printing unit is unable to print the additional information at a trailing end position in the sheet conveying direction on the sheet whose size is unknown to the printing apparatus.

27. The printing apparatus according to claim 12,
further comprising a manual feed tray,
wherein the sheet whose size is unknown to the printing apparatus is conveyed by the conveying unit from the manual feed tray.

28. A method for controlling a printing apparatus which prints an image and additional information on a sheet, comprising:
setting a position specified by a user as a position on the sheet where the additional information is to be printed;
conveying the sheet on which the image and the additional information are to be printed; and
printing the image and the additional information on the conveyed sheet;
wherein, for a sheet whose size is known to the printing apparatus, the additional information is printed at the position specified by the user and set by the print position setting unit as the position where the additional information is to be printed, and
wherein, for a sheet whose size is unknown to the printing apparatus at a point in time of receiving a printing instruction from the user, the additional information is printed at a leading end positon only in a sheet conveying direction, in which the sheet is conveyed by the conveying unit.

29. The method according to claim 28, wherein the position specified by the user is possible to be a tailing end position on the sheet in the sheet conveying direction.

30. The method according to claim 28, wherein the position specified by the user is possible to be a leading end position on the sheet in the sheet conveying direction.

31. The method according to claim 28,
wherein, for the sheet whose size is unknown to the printing apparatus, the additional information is printed at the leading end positon only in the sheet conveying direction, in which the sheet is conveyed, regardless of the setting.

32. The method according to claim 31,
wherein, for the sheet whose size is unknown to the printing apparatus, the additional information is printed at the leading end positon only in the sheet conveying direction, in which the sheet is conveyed, even though a trailing end position on the sheet in the sheet conveying direction has been set as the position on the sheet where the additional information is to be printed.

33. The method according to claim 28, further comprising:
setting for the printing apparatus, on a basis of a user instruction, that the size of the sheet on which the image is to be printed is unknown;

wherein, in a case where the setting that the size of the sheet on which the image is to be printed is unknown is set for the printing apparatus, the sheet which is conveyed and on which the image is printed is treated as the sheet whose size is unknown to the printing apparatus.

* * * * *